(12) United States Patent
Mah

(10) Patent No.: US 11,953,594 B2
(45) Date of Patent: Apr. 9, 2024

(54) APPARATUS, SYSTEM AND METHOD FOR DETECTING OBJECTS COMPRISING A CONVERGING LENS ASSEMBLY THAT COMPRESSES THE PARTIALLY AUGMENTED LIGHT SIGNAL IN A MINOR PLANE FROM A DIVERGING LENS ASSEMBLY TO FORM A FAN-SHAPED AUGMENTED LIGHT SIGNAL

(71) Applicant: TKS Industries Ltd., Lacombe (CA)

(72) Inventor: Ernest Moon Mah, Calgary (CA)

(73) Assignee: TKS Industries Ltd., Lacombe (CA)

( * ) Notice: Subject to any disclaimer, the term of this patent is extended or adjusted under 35 U.S.C. 154(b) by 607 days.

(21) Appl. No.: 16/787,871

(22) Filed: Feb. 11, 2020

(65) Prior Publication Data

US 2020/0264307 A1  Aug. 20, 2020

Related U.S. Application Data

(60) Provisional application No. 62/807,698, filed on Feb. 19, 2019.

(51) Int. Cl.
*G01S 17/04* (2020.01)
*G01S 7/481* (2006.01)
*G01S 17/10* (2020.01)

(52) U.S. Cl.
CPC ............ *G01S 17/04* (2020.01); *G01S 7/4811* (2013.01); *G01S 17/10* (2013.01)

(58) Field of Classification Search
CPC .......... G01S 17/04; G01S 17/02; G01S 17/06; G01S 17/10; G01S 7/48; G01S 17/88; G01S 17/89
USPC .................................................. 250/221, 216
See application file for complete search history.

(56) References Cited

U.S. PATENT DOCUMENTS

| | | | |
|---|---|---|---|
| 7,688,348 B2 | 3/2010 | Lubard et al. | |
| 7,966,739 B2* | 6/2011 | Kamizono | G01S 17/42 33/290 |
| 9,879,990 B2* | 1/2018 | Klepsvik | G01S 7/4972 |
| 10,436,904 B2* | 10/2019 | Moss | G01S 17/89 |

* cited by examiner

*Primary Examiner* — Que Tan Le
(74) *Attorney, Agent, or Firm* — Gowling WLG (Canada) LLP

(57) ABSTRACT

Embodiments of the present disclosure relate to an object detection system that comprises at least one laser component. The at least one laser component is configured to generate an augmented light signal with a fan shape in a first plane. The at least one laser component is also configured to receive and detect a reflected light signal when an object is within a predetermined region of interest of the augmented light signal. In some embodiments of the present disclosure, the at least one laser component is configured to receive a reflected light signal from small objects than may be detected by other known object detection systems.

16 Claims, 8 Drawing Sheets

FIG. 2A
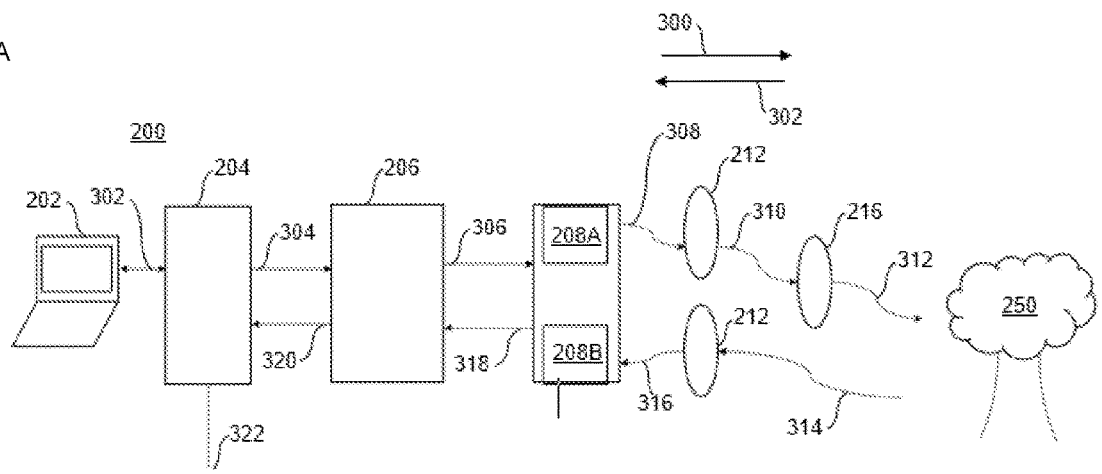
FIG. 2B
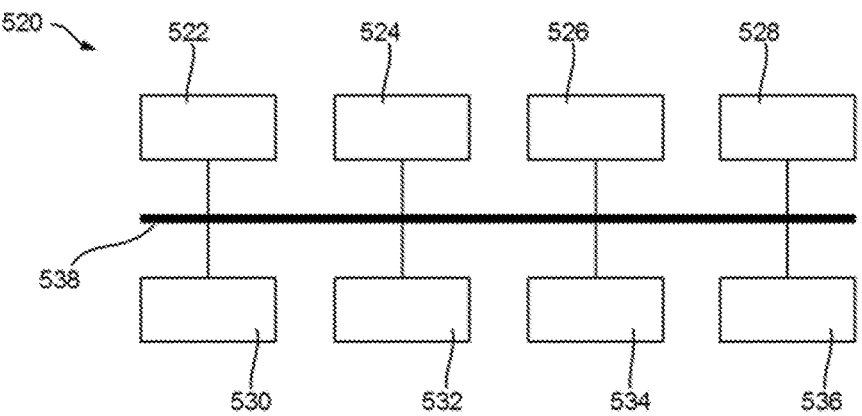
FIG. 2C
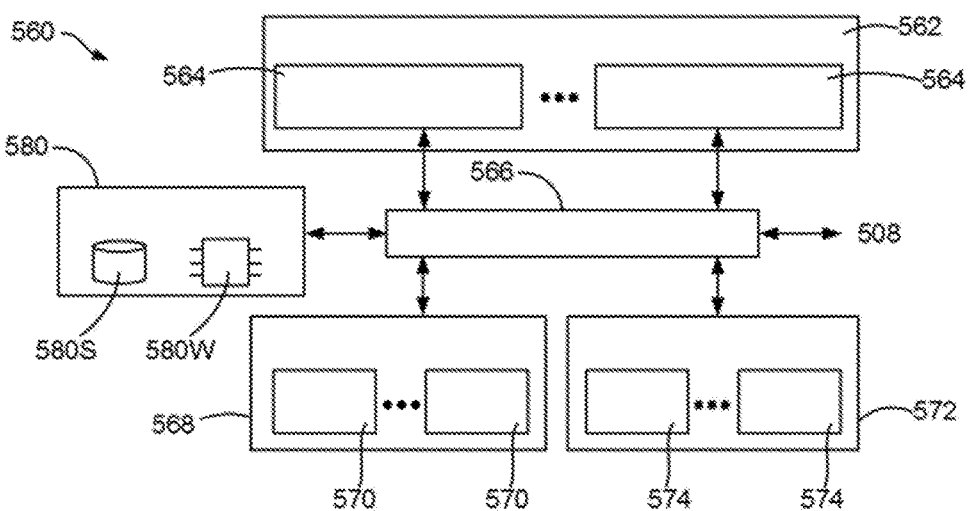
FIG. 2

FIG. 4A
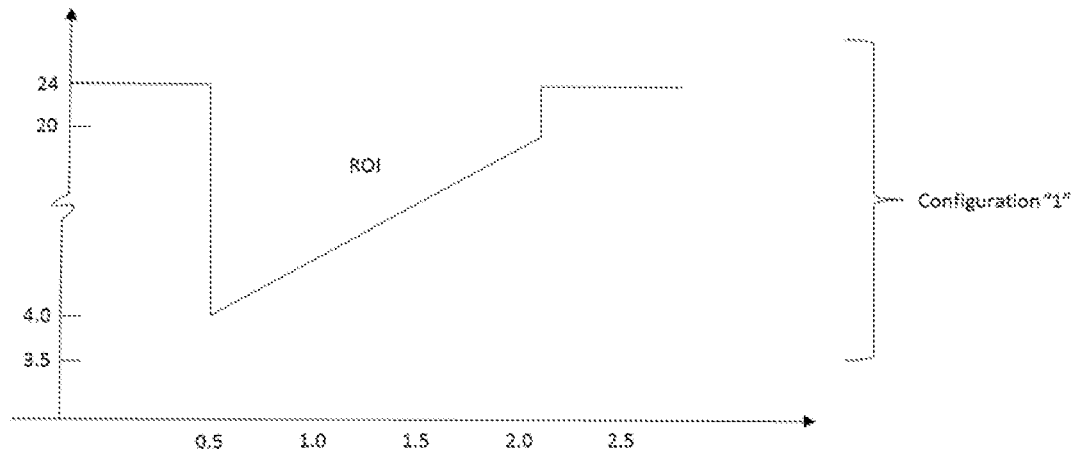
FIG. 4B
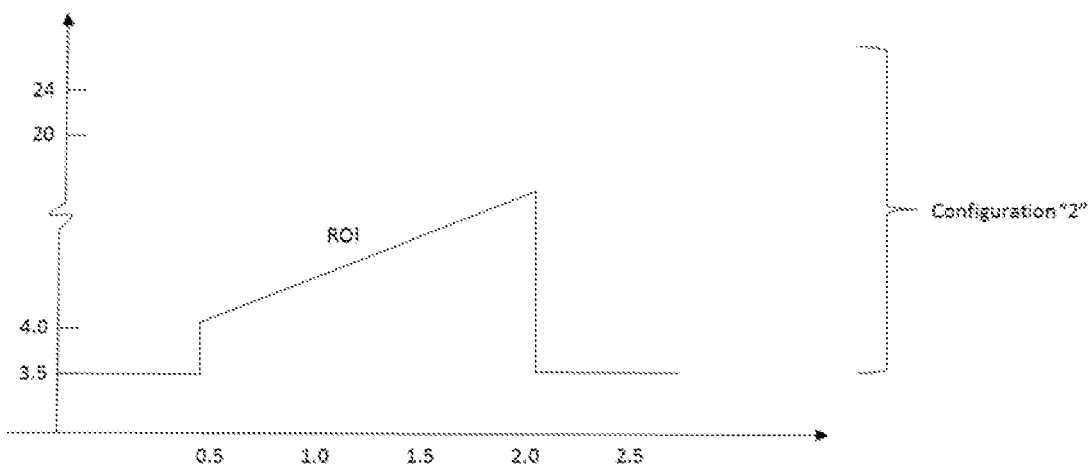
FIG. 4

FIG. 6A
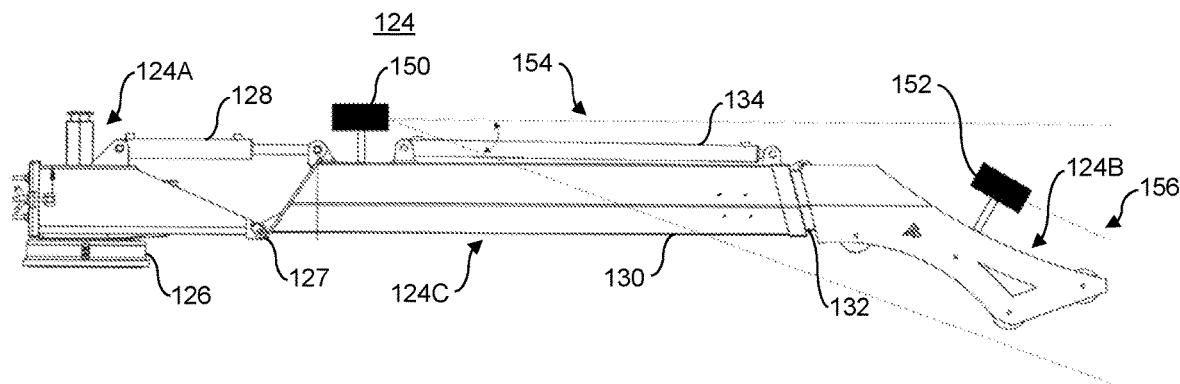
FIG. 6B
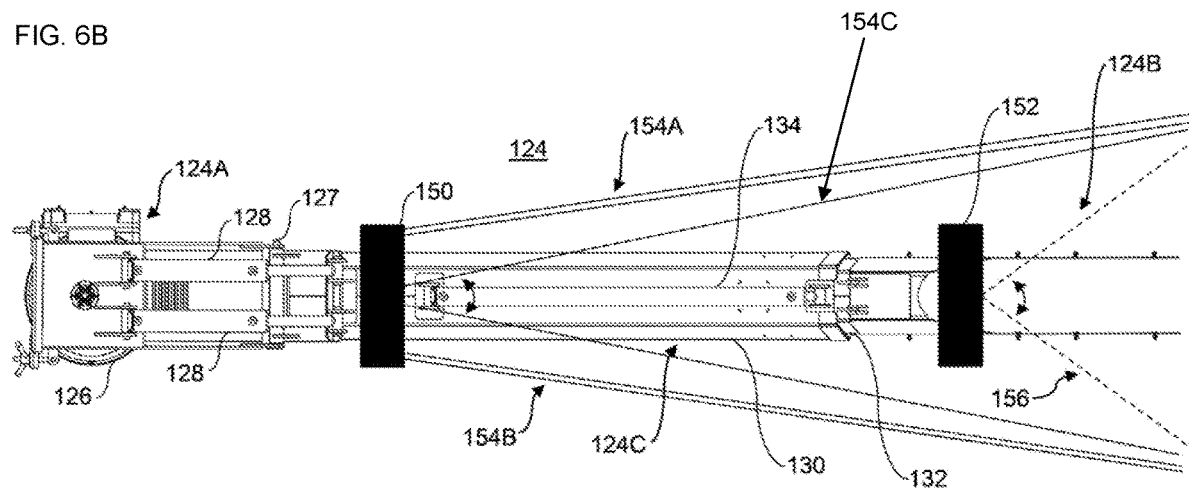
FIG. 6

APPARATUS, SYSTEM AND METHOD FOR DETECTING OBJECTS COMPRISING A CONVERGING LENS ASSEMBLY THAT COMPRESSES THE PARTIALLY AUGMENTED LIGHT SIGNAL IN A MINOR PLANE FROM A DIVERGING LENS ASSEMBLY TO FORM A FAN-SHAPED AUGMENTED LIGHT SIGNAL

TECHNICAL FIELD

This disclosure generally relates to light detecting and ranging (LIDAR). In particular, the disclosure relates to an apparatus, system and method for detecting objects using an augmented light signal.

BACKGROUND

Light detecting and ranging (LIDAR) generally uses a light source that generates a focal light signal, such as a laser. LIDAR also generally uses a receiver that receives and detects a reflected light signal back from an object that is struck by the focal light signal. By measuring the time between the emitting of the focal light signal and the receipt of any reflected light signal allows one to determine how far away the object is from the light source.

Often the focal light signal is focused to ensure that the energy density of the focal light signal is sufficiently high to allow the reflected light signal from distant objects to have sufficient energy to be received and detected by the receiver.

In order to scan an area larger than the cross-sectional area of the focal light signal, LIDAR systems emit multiple pulses of the focal light signal by directing the light source in a sweeping pattern across an area of interest.

Such scanning LIDAR systems are often successful at detecting a reflected light signal from an object within the area of interest when such an object is considerably larger than the cross-sectional area of the focal light signal. For example, a first pulse of the focal light signal may strike the larger object and a second pulse—that is aimed at a slightly different orientation than the first pulse due to the sweeping pattern—may also strike the large object. This will generate at least two reflected light signals that the receiver can receive and detect. However, smaller objects within an area of interest pose a challenge to detection by known scanning LIDAR systems because such smaller objects may be positioned between the pulses of the focal light signal when the light source is directed in the sweeping pattern. In other words, the sweeping of focal light sources may "miss" smaller objects within the area of interest.

SUMMARY

Some embodiments of the present disclosure relate to an apparatus, system and method for detecting smaller objects within an area of interest, as well as to boom assemblies comprising the systems of the present disclosure. In particular, some embodiments of the present disclosure relate to creating one or more planes of a transmitted light signal that are directed away from one or more surfaces of an object. An object that is struck by the one or more planes of the transmitted light signal will generate a reflected signal that is received and detected by a receiver. The transmitted light signal has an augmented shape, which is also referred to as a fan shape. The augmented shape permits the transmitted light signal to retain a desired energy density within a predetermined region of interest (ROI). The desired energy density may allow for the reflected signal to be of a sufficient amplitude and/or specific wavelength to facilitate receipt and detection by the receiver. Furthermore, the augmented shape allows for the transmitted light signal to be transmitted as a pulse with a substantially continuous light signal across the predetermined region of interest. As compared to the focal light signals that are transmitted as a pulse in a sweeping pattern, a substantially continuous signal may increase the likelihood that a smaller object within the predetermined region of interest is hit by the transmitted light signal for generating a reflected signal. Furthermore, in some embodiments of the present disclosure, the receiver can be programmed to respond only to those objects within the predetermined region of interest. This programming may be based upon time of flight analysis and it may decrease the noise generated by ambient light or other objects that are outside of the predetermined region of interest.

In some embodiments of the present disclosure, the one or more planes of the transmitted light signal are directed away from a stationary object. In some embodiments of the present disclosure, the one or more planes of the light source are directed away from a moving object. In some embodiments of the present disclosure, the one or more planes of the light sources are directed away from a component that can move relative to a stationary object.

Some embodiments of the present disclosure relate to an object detection system that comprises at least one laser component. The at least one laser component is configured to generate an augmented light signal a first plane. The at least one laser component is also configured to receive and detect a reflected light signal when an object is within a predetermined region of interest (ROI) of the augmented light signal.

In some embodiments of the object detection system disclosed herein, the object detection system is connectible to a primary object. In a further embodiment, the primary object is moveable.

In some embodiments of the object detection system disclosed herein, the at least one laser component comprises a first laser component and a second laser component. Each of first and second laser components are configured to generate an augmented light signal. As well, each of the first and second laser components are configured to receive and detect a reflected light signal when an object is within a predetermined region of interest (ROI) within each fan-shaped augmented light signal. In a further embodiment, each laser component is configured to use a time of flight analysis to determine if an object is within one or more of the augmented light signals. In a yet further embodiment, the laser component is further configured to generate a trigger output signal that can be transmitted to a computing device for sending an activation signal to one or more of: an audible alarm, a light-based alarm and a power kill switch. In a still further embodiment, the trigger output signal is a current loop that is from about 4 mA to about 20 mA. In a further embodiment, the augmented light signal generated by the first laser component and the augmented light signal generated by the second laser component have different orientations relative to each other.

In some embodiments of the object detection system disclosed herein, the augmented light signal has a fan shape. In a further embodiment, the augmented light signal has an angle of divergence of about 10 degrees to about 70 degrees.

In some embodiments of the object detection system disclosed herein, the predetermined region of interest is from 0.5 m to 2.0 m away from the at least one laser component.

In some embodiments of the object detection system disclosed herein, the at least one laser component is configured to generate a laser pulse and to transmit the laser pulse through a diverging lens assembly followed by a converging lens assembly in order to generate the augmented light signal. In a further embodiment, the at least one laser component is configured to receive the reflected light signal through the diverging lens assembly from a direction opposite that of the laser pulse in order to converge the reflected light signal into a focused signal.

In some embodiments of the object detection system disclosed herein, the laser pulse has a wavelength of about 700 nm to about 1200 nm.

In some embodiments of the object detection system disclosed herein, the augmented light signal is a continuous augmented light signal.

Another embodiment of the present disclosure relates to a boom assembly comprising a support arm and the object detection system of the present disclosure mounted on the support arm.

In some embodiments of the boom assembly disclosed herein, the at least one laser component of the object detection system comprises a first laser component positioned on an upper surface of a middle portion of the support arm and a second laser component positioned proximal an end of the support arm.

In some embodiments of the boom assembly of the present disclosure, the boom assembly is mounted on a tank of a vacuum excavation truck and further comprises a vacuum tube that is supported by the support arm.

Another embodiment of the present disclosure relates to a method of detecting an object. The method comprises generating at least one augmented light signal, receiving a light signal reflected from an object struck by one or more of the at least one augmented light signal, and determining whether the object is within a predetermined region of interest (ROI).

In some embodiments of the method of the present disclosure, the augmented light signal is a continuous augmented light signal.

In some embodiments of the method of the present disclosure, the augmented light signal has a fan shape.

BRIEF DESCRIPTION OF THE DRAWINGS

These and other features of the present disclosure will become more apparent in the following detailed description in which reference is made to the appended drawings.

FIG. 1 shows various embodiments of the present disclosure, wherein

FIG. 1A is a top-plan view of a one embodiment of the present disclosure; FIG. 1B is a side-elevation view of the embodiment shown in FIG. 1A; FIG. 1C is a top-plan view of another embodiment of the present disclosure; and, FIG. 1D is a top-plan view of yet another embodiment of the present disclosure.

FIG. 2 shows schematic diagrams of features of an object detecting system according to the present disclosure, wherein FIG. 2A shows a schematic diagram of one embodiment of an object detecting system; FIG. 2B shows a schematic diagram of features of a simplified hardware structure of a computer shown in FIG. 2A; and, FIG. 2C shows a schematic diagram of a simplified software architecture of the computer shown in FIG. 2B.

FIG. 4 are a series of line graphs that each depict different configurations of current loops for use with embodiments of the present disclosure, wherein FIG. 4A depicts a first configuration of a current loop; FIG. 4B depicts a second configuration of a current loop.

FIG. 6 shows one embodiment of an object-detecting system according to the present disclosure for use with the boom assembly shown in FIG. 5, wherein FIG. 6A shows a top-plan view of the object-detecting apparatus; and, FIG. 6B shows a side-elevation view of the object-detecting apparatus.

FIG. 7 shows two schematics that each represent one embodiment of an object-detecting system according to the present disclosure, wherein FIG. 7A shows a first embodiment of an object-detecting system; and, FIG. 7B shows a second embodiment of an object-detecting system.

DETAILED DESCRIPTION

Figure 1:
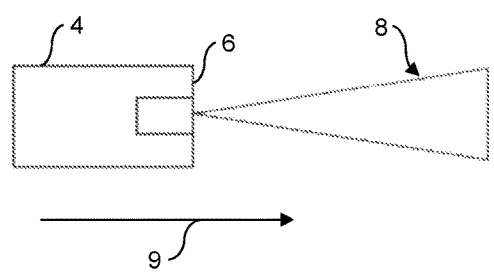
Figure 1:
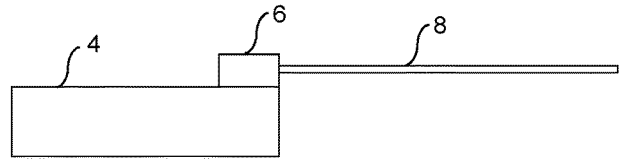
Figure 1:
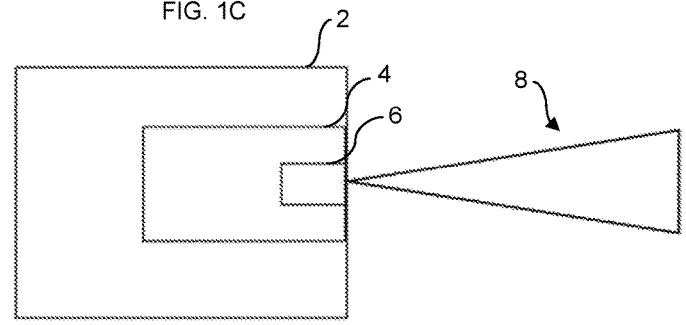
Figure 1:
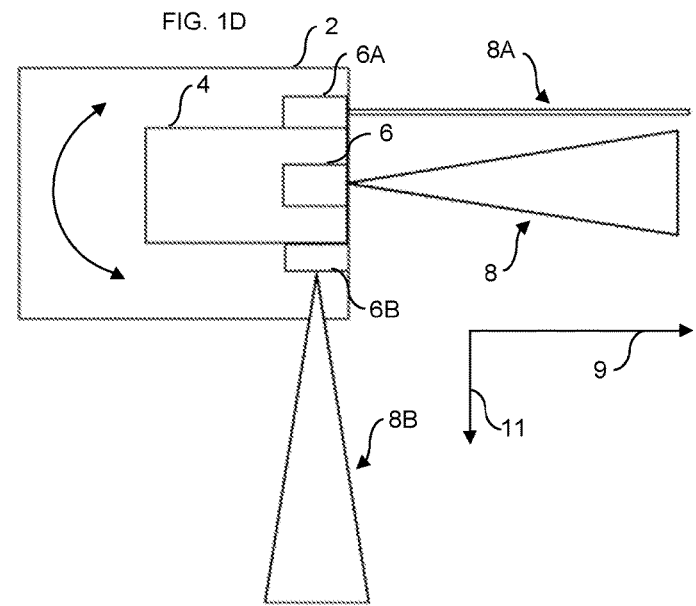

Unless defined otherwise, all technical and scientific terms used herein have the same meaning as commonly understood by one of ordinary skill in the art to which this disclosure belongs. As used herein, the term "about" refers to an approximately +/−10% variation from a given value. It is to be understood that such a variation is always included in any given value provided herein, whether or not it is specifically referred to.

Embodiments of the present disclosure will now be described by reference to FIG. 1 to FIG. 9, which show representations of an object detecting apparatus, system and method according to the present disclosure.

FIG. 1A shows a top-plan view of one embodiment of the present disclosure where an object detecting apparatus 6 is connectible to a portion of a primary object 4. The object detecting apparatus 6 emits an augmented light signal 8 away from a surface of the primary object 4 in a first direction 9. As shown by comparing FIG. 1A and FIG. 1B, the augmented light signal 8 may have various shapes, including a fan shape, or a compressed frustoconical shape, in one aspect and a thin planar shape with a comparatively smaller angular span in a second aspect than the first plane. More specifically, the augmented light signal 8 has a greater angular span along a first plane than along a second plane (which may be a plane perpendicular to the first plane in some embodiments of the present disclosure) such that the augmented light signal 8 may have a virtually planar span along the first plane. Hereinafter, the first plane may be denoted as the major light-span plane or the major plane and the second plane may be denoted as the minor light-span plane or the minor plane.

In some embodiments of the present disclosure, the shape of the augmented transmitted light signal 8 may allow for a conservation of energy density within the signal 8. In some embodiments of the present disclosure, the primary object 4 is stationary when the object detection apparatus 6 is in use. In some embodiments of the present disclosure, the primary object 4 is substantially stationary when the object detection apparatus 6 is in use. In some embodiments of the present disclosure, the primary object 4 may move or is moving when the object detection apparatus 6 is in use.

FIG. 1C shows another embodiment of the present disclosure where the object detecting apparatus 6 is connectible to the primary object 4, which is a component of a secondary object 2. In this embodiment, the secondary object 2 may be stationary, or movable depending on the implementation and/or use, and the primary object 4 may move relative to the secondary object 2 when the object detection apparatus 6 is in use.

FIG. 1D shows a further embodiment of the present disclosure where there are multiple object detecting apparatus 6, 6A and 6B. Each apparatus 6, 6A and 6B each emit an augmented light signal 8, 8A and 8B, respectively. As shown in FIG. 1D, each signal 8, 8A and 8B may be emitted away from a different surface of the primary object 4. Furthermore, the signals 8, 8A and 8B may be emitted at different orientations relative to each other. For example, signal 8 and signal 8A may each extend away from the same surface of the primary object 4 in the first direction 9, but the major light-span plane of signal 8 (i.e. the fan-shaped aspect) may be emitted at an angle relative to that of the signal 8A. In some embodiments of the present disclosure, this angle may be between about 1 and about 179 degrees. In FIG. 1D this angle is shown as being about 90 degrees so that the major light-span plane of signal 8 is substantially perpendicular to that of signal 8A but both signals extend in the first direction 9. For clarity, the present disclosure will refer to an extension orientation of an augmented light signal 8, which refers to the general direction at which the augmented light signal 8 extends away from the primary object 4. For example, signal 8 and signal 8A have a similar or the same extension orientation, which is different from the extension orientation of signal 8B.

The present disclosure will also refer to the angle of the major light-span plane (denoted "major-plane angle") of the augmented light signal 8, which refers to the angle between major light-span plane and a predefined reference plane. For example, signals 8 and 8B have a similar major-plane angle and both have a different major-plane angle compared to signal 8A.

FIG. 2A is a schematic of an object detecting system 200 according to embodiments of the present disclosure and an object 250. The system 200 comprises a computer 202 in communication with a control and processing circuit 204 which controls an encoder/decoder unit 206 to encode and emit a light from a light source 208A through a set of lens assemblies 212 and 216. The encoded light may be reflected by the object 250 and detected by a reflected signal receiver 208B, which sends the detected light to the encoder/decoder unit 206 for decoding. The encoder/decoder unit 206 then sends decoded signal to the computer 202 through the control and processing circuit 204.

FIG. 2B shows a hardware structure 520 of the computer 202. As shown, the computer 202 comprises a processing structure 522, a controlling structure 524, a memory or storage 526, a networking interface 528, a coordinate input 530, a display output 532, and other input and output modules 534 and 536, all functionally interconnected by a system bus 538.

The processing structure 522 may be one or more single-core or multiple-core computing processors such as INTEL® microprocessors (INTEL is a registered trademark of Intel Corp., Santa Clara, CA, USA), AMD® microprocessors (AMD is a registered trademark of Advanced Micro Devices Inc., Sunnyvale, Calif., USA), ARM® microprocessors (ARM is a registered trademark of Arm Ltd., Cambridge, UK) manufactured by a variety of manufactures such as Qualcomm of San Diego, California, USA, under the ARM® architecture, or the like.

The controlling structure 524 comprises one or more controlling circuits, such as graphic controllers, input/output chipsets and the like, for coordinating operations of various hardware components and modules of the computer 202.

The memory 526 comprises a plurality of memory units accessible by the processing structure 522 and the controlling structure 524 for reading and/or storing data, including input data and data generated by the processing structure 522 and the controlling structure 524. The memory 526 may be volatile and/or non-volatile, non-removable or removable memory such as RAM, ROM, EEPROM, solid-state memory, hard disks, CD, DVD, flash memory, or the like. In use, the memory 526 is generally divided to a plurality of portions for different use purposes. For example, a portion of the memory 526 (denoted as storage memory herein) may be used for long-term data storing, for example, for storing files or databases. Another portion of the memory 526 may be used as the system memory for storing data during processing (denoted as working memory herein).

The networking interface 528 comprises one or more networking modules for connecting to other computers or networks through the network 508 by using suitable wired or wireless communication technologies such as Ethernet, WIFI® (WI-FI is a registered trademark of Wi-Fi Alliance, Austin, Tex., USA), BLUETOOTH® (BLUETOOTH is a registered trademark of Bluetooth Sig Inc., Kirkland, WA, USA), ZIGBEE® (ZIGBEE is a registered trademark of ZigBee Alliance Corp., San Ramon, CA, USA), 3G, 4G and/or 5G wireless mobile telecommunications technologies, and/or the like. In some embodiments, parallel ports, serial ports, USB connections, optical connections, or the like may also be used for communication between the computer 202 and the control and processing circuit 204.

The display output 532 comprises one or more display modules for displaying images, such as monitors, LCD displays, LED displays, projectors, and the like. The display output 532 may be a physically integrated part of the computer 202 (for example, the display of a laptop computer or tablet), or may be a display device physically separate from but functionally coupled to other components of the computer 202 (for example, the monitor of a desktop computer).

The coordinate input 530 comprises one or more input modules for one or more users to input coordinate data, such as touch-sensitive screen, touch-sensitive whiteboard, trackball, computer mouse, touch-pad, or other human interface devices (HID) and the like. The coordinate input 530 may be a physically integrated part of the computer 202 (for example, the touch-pad of a laptop computer or the touch-sensitive screen of a tablet), or may be a display device physically separate from, but functionally coupled to, other components of the computer 202 (for example, a computer mouse). The coordinate input 530, in some implementation, may be integrated with the display output 532 to form a touch-sensitive screen or touch-sensitive whiteboard.

The computer 202 may also comprise other input 534 such as keyboards, microphones, scanners, cameras, Global Positioning System (GPS) component, and/or the like. The computer 202 may further comprise other output 536 such as speakers, printers and/or the like.

The system bus 538 interconnects various components 522 to 536 enabling them to transmit and receive data and control signals to and from each other.

FIG. 2C shows a simplified software architecture 560 of the computer 202. The software architecture 560 comprises an application layer 562, an operating system 566, an input interface 568, an output interface 572, and a logic memory 580. The application layer 562 comprises one or more application programs 564 executed by or run by the processing structure 522 for performing various tasks. The operating system 566 manages various hardware components of the computer 202 via the input interface 568 and the output interface 572, manages the logic memory 580, and manages and supports the application programs 564. The operating system 566 may also be in communication with other computers (not shown) via the network 508 to allow application programs 564 to communicate with those running on other computers. As those skilled in the art will appreciate, the operating system 566 may be any suitable operating system such as MICROSOFT® WINDOWS® (MCROSOFT and WINDOWS are registered trademarks of the Microsoft Corp., Redmond, WA, USA), APPLE® OS X, APPLE® iOS (APPLE is a registered trademark of Apple Inc., Cupertino, CA, USA), Linux, ANDROID® (ANDRIOD is a registered trademark of Google Inc., Mountain View, CA, USA), or the like.

The input interface 568 comprises one or more input device drivers 570 for communicating with respective input devices including the coordinate input 530. The output interface 572 comprises one or more output device drivers 574 managed by the operating system 566 for communicating with respective output devices including the display output 532. Input data received from the input devices via the input interface 568 is sent to the application layer 562, and is processed by one or more application programs 564. The output generated by the application programs 564 is sent to respective output devices via the output interface 572.

The logical memory 580 is a logical mapping of the physical memory 526 for facilitating the application programs 564 to access. In this embodiment, the logical memory 580 comprises a storage memory area (580S) that may be mapped to a non-volatile physical memory such as hard disks, solid state disks, flash drives, and the like, generally for long-term data storage therein. The logical memory 580 also comprises a working memory area (580W) that is generally mapped to high-speed, and in some implementations volatile, physical memory such as RAM, generally for application programs 564 to temporarily store data during program execution. For example, an application program 564 may load data from the storage memory area 580S into the working memory area 580W, and may store data generated during its execution into the working memory area 580W. The application program 564 may also store some data into the storage memory area 580S as required or in response to a user's command.

Referring back to FIG. 2A, the detail of the object detecting system 200 is now described.

The computer 202 is configurable by an operator to set up and configure a control and processing circuit 204. The computer 202 can be used to configure the system 200 to define a predetermined region of interest (ROI) by defining a minimum distance from a light source 208A and a maximum distance from the light source 208A. That is, the predetermined region of interest may be defined relative to a laser component producing the augmented light signal. The computer 202 can also be used to configure the signal output types and parameters of the other components within the system 200. For example, signal output types may include variations in voltage, current, current loops and other signal types that are appreciated by those skilled in the art. The computer 202 can also be used to define a pulse coding for each pulse of each augmented light signal that is generated by the light source 208A and for defining the intervals between each augmented light signal that are emitted from the light source 208A. The computer 202 can also configure a data acquisition profile of a reflected signal 314 and define reporting constructs as desired by an operator.

The control and processing circuit 204 collaborates with the computer 202 by the bi-directional communication signal 302 to configure the signal output types and parameters of other components in the system 200, to encode the pulse coding and to configure a reflected signal receiver 208B to process reflected signals within the predetermined region of interest. Herein, the bi-directional communication signal 302 may be transmitted using any suitable wired or wireless communication technologies such as such as Ethernet, WI-FI®, BLUETOOTH®, ZIGBEE®, 3G, 4G and/or 5G wireless mobile telecommunications technologies, parallel ports, serial ports, USB connections, optical connections, and/or the like. In some embodiments of the present disclosure, the control and processing circuit 204 can be a real-time computing device that has one or more of the same features shown in FIG. 2B and FIG. 2C and described herein above. In some embodiments of the present disclosure the features of the control and processing circuit 204 can be customized so that it can provide the functionality described herein.

The control and processing circuit 204 can also log data that is captured by the system 200 to monitor performance parameters such as, but not limited to: samples of reflected signal captured per measurement, measurement rates, power of each pulse of the augmented light signal, ambient light levels, strength of the received reflected signal, error correction levels and other performance parameters that are appreciated by those skilled in the art.

The control and processing circuit 204 can operatively communicate with an encoder/decoder unit 206 by a command signal 304 and by receiving a detected signal 320. The encoder/decoder unit 206 can configure a predistortion of each pulse of the augmented light signal to optimize transmission efficiency of each pulse of the augmented light signal. The encoder/decoder unit 206 can also encode for encoding the pulse code so that each pulse of the augmented light signal has a unique identification code and time stamp. The encoder/decoder unit 206 also defines the ideal rates for making each measurement of the system 200.

The control and processor circuit 204 can operatively communicate with an encoder/decoder unit 206 by sending a command signal 304 thereto and by receiving a detected signal 320 therefrom. The encoder/decoder unit 206 can configure a predistortion of each pulse of the augmented light signal to optimize transmission efficiency of each pulse of the augmented light signal. The encoder/decoder unit 206 can also encode each pulse of the augmented light signal using a suitable pulse code so that each pulse of the augmented light signal has a unique identification code and time stamp. The encoder/decoder unit 206 also defines suitable or optimized rates for making each measurement of the system 200.

The encoder/decoder unit 206 thus can operatively communicate with a light source transmitter 208A using a command signal 306 to generate an encoded light signal. In particular, the light source transmitter 208A, under the command of the encoder/decoder unit 206, generates and transmits a high energy light 308 in the form of a laser pulse that is encoded by the pulse code. In some embodiments of the present disclosure, the laser pulse is within a range of wavelengths of the electromagnetic spectrum between about 700 nanometers (nm) to about 1200 nm. In some further embodiments of the present disclosure the laser pulse is within a range of wavelengths of the electromagnetic spectrum about 800 nm to about 1100 nm. In some embodiments of the present disclosure, the laser pulse is within a range of wavelengths of the electromagnetic spectrum about 900 nm to about 1000 nm. In some embodiments of the present disclosure, the laser pulse is close to or within the infrared portion of the electromagnetic spectrum. For example, the laser pulse may have a wavelength of about 905 nm. The transmitter 208A may also collimate the laser pulse into a focal light signal prior to the laser pulse emitting from the transmitter 208A.

After being emitted from the light source transmitter 208A, the laser pulse 308 passes through a diverging lens assembly 212 that augments the laser pulse 308 into a fan shape along the major plane. The fan shape can be defined by an angle of span, which may also be referred to herein as an angle of divergence, which can be configured to be between about 10 degrees and about 70 degrees. The smaller the angle of divergence the greater the effective distance of the predetermined region of interest can be set. For example, if the angle of divergence is set at about 17 degrees, the effective distance of the predetermined region of interest can be around 10 meters. If the angle of divergence is set at about 34 degrees, the effective distance of the predetermined region of interest can be around 5 meters. If the angle of divergence is set at about 68 degrees, the effective distance of the predetermined region of interest can be around 2.5 meters. The larger the angle of divergence the smaller the effective distance of the predetermined region of interest when the same amount energy within the laser pulse is constant, which is a result of decreased energy density when the laser pulse has a greater angle of divergence.

After passing through the diverging lens assembly 212, the pulse laser is now a partially augmented light signal 310 that passes through a converging lens assembly 216 that compresses the partially augmented light signal 310 in the minor plane to form the augmented light signal 312. The compression step increases the energy density within the augmented light signal 312, which allows the system 200 to detect smaller objects at greater effective distances within the predetermined region of interest.

The augmented light signal 312 will travel in a first direction 300 until it strikes the object 250. Provided that the object 250 can reflect light, the object 250 will cause the reflected light signal 314 to travel in an opposite direction 302. The reflected signal 314 can pass through the diverging lens assembly 212, which when travelling in the opposite direction 302 will converge the reflected signal 314 into a smaller and more focused signal 316, which may protect the system 200 from overloading due to excessive ambient light.

The smaller and more focused signal 316 will pass through a reflected signal receiver 208B. The reflected signal receiver 208B can amplify and condition the focused signal 316 and direct that amplified and conditioned signal 318 to the encoder/decoder unit 206 where the difference between the time stamp within the pulse code is compared with the time the amplified signal 318 is received to perform a time of flight analysis to determine the distance that the reflected light signal 314 travelled to assess how far the object 250 is from the system 200. The encoder/decoder unit 206 is also configured to adjust the energy levels within each laser 308 to compensate for ambient light levels detected in the amplified signal 318. The encoder/decoder unit 206 then sends a trigger command to the control and processor circuit 204 for generating a trigger output signal 322 for transmission to other downstream components of the system 200, as discussed further below.

The trigger output signal 322 is used to convey that an object has been detected within the predetermined area of interest. The format of the trigger output signal 322 can be selected between one or more of a preset voltage (for example 0 to 10 volts), a current loop (for example in one embodiment of the present disclosure the current loop is between about 4 mA to about 20 mA and in another embodiment the current loop is between about 3.5 mA and about 24 mA), serial data in an RS-232 format or other signal formats as are appreciated by those skilled in the art.

Figure 3:
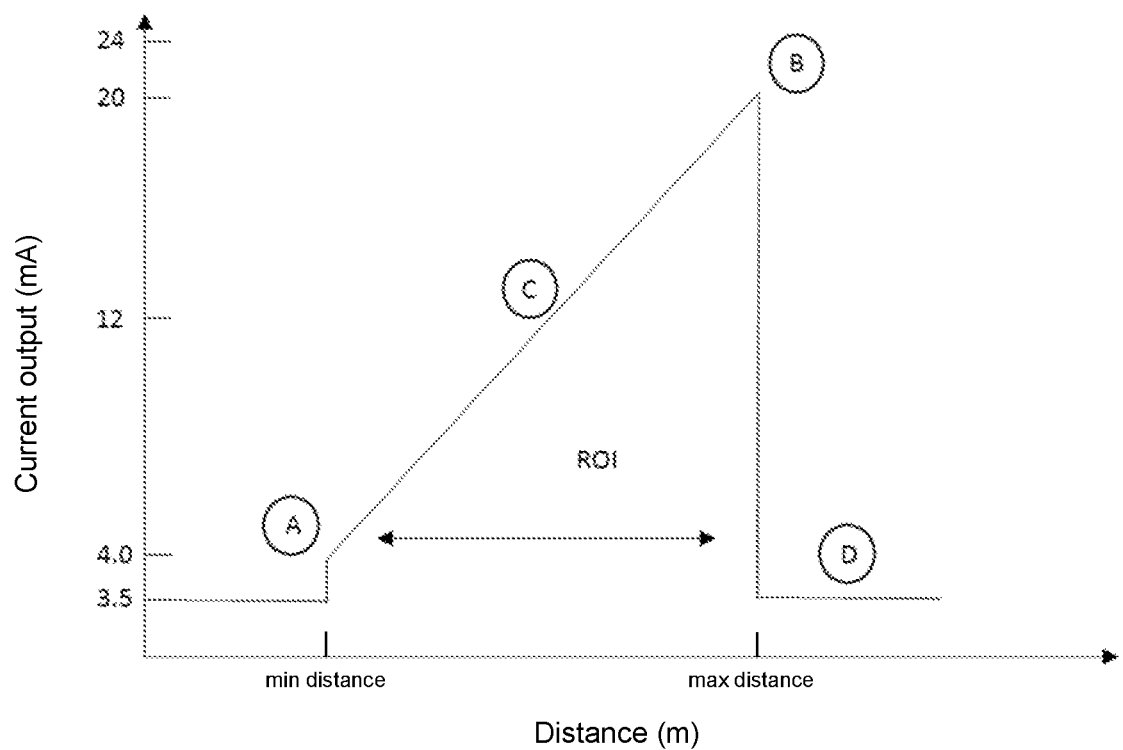
FIG. 3 is a line graph that depicts an example of a current loop for use with embodiments of the present disclosure, wherein the x axis represents distance in meters (m) from a light source and the y axis represents a current output in milliamps (mA).

FIG. 3 is a line graph that depicts one embodiment of the present disclosure where the trigger output signal 322 is a current loop that is between about 4 mA and 20 mA. This range of the current loop may be preferred because it is less susceptible to electrical noise of human origin or natural origin, such as lightning. The x axis is the distance (m) of the object 250 that generated the reflected signal 314 from the system 200. The y axis is the current output (mA). If the system 200 does not detect a reflected light signal 314 or is flooded by a reflected light signal 314 reflected from an object that is too close to the system 200, then the trigger output signal 322 will be at a sub-threshold value of less than 4 mA. If the system 200 assesses that a portion of the object 250 that caused the reflected light signal 314 is within a minimum distance (for example 1 m) then the trigger output signal 322 will increase to a threshold of 4 mA (see point A on FIG. 3). If the portion of the object 250 that caused the reflected light signal 314 is at a maximum distance (for example 10 m) then the trigger output signal 322 will be 20 mA (see point B on FIG. 3). Together the minimum distance and the maximum distance define the predetermined region of interest. As such, if the assessed distance of the portion of the object 250 that generated the reflected signal falls within the predetermined region of interest, then the trigger output signal 322 will be between 4 mA and 20 mA (see point C on FIG. 3) with a linear relationship with the assess distance of the portion of the object 250. In the event that the portion of the object 250 that generated the reflected light signal is greater than the maximum distance, it will be ignored by the system 200 because the trigger output signal 322 will be lower than the threshold value of 4 mA (see point D on FIG. 3). When the trigger output signal 322 is between 4 mA and 20 mA then an event condition occurs and the trigger output signal 322 will trigger downstream events.

FIG. 4 shows other configurations of the current loop. In the configuration of FIG. 4A, the predetermined region of interest is between 0.5 m and 2.0 m. Such that when a portion of the object 250 that generates the reflected light signal 314 is within the predetermine region of interest the trigger output signal 322 will have an output of between about 4 mA and about 20 mA and this will cause an event condition and downstream events. When the portion of the object 250 that generates the reflected light signal 314 is outside of the predetermine region of interest, then the trigger output signal 322 remains at about 24 mA. FIG. 4B shows a similar configuration as FIG. 3 except the predetermined region of interest has a minimum distance of about 0.5 m and maximum distance of about 2 m.

That is, in general, methods of detecting an object include generating at least one augmented light signal having a fan shape. The augmented light signal may be a continuous augmented light signal, as previously discussed herein. As well, the generation of the augmented light signal may be accomplished using any of the configurations previously described herein (e.g. light source transmitter 208A, diverging lens assembly 212, and converging lens assembly 216). The detecting of the object further includes receiving a light signal reflected from an object struck by one or more of the at least one augmented light signal (e.g. by way of the signal receiver 208B previously described herein). Using the received signal, it is then determined whether the object is within a predetermined region of interest of the augmented light source. As previously described herein, this step may be accomplished using the encoder/decoder unit 206 processor circuit 204 to generate the trigger output signal 322. If the trigger output signal 322 is within a predetermined range, the object may subsequently be determined to be within the region of interest of the augmented light source.

Further, the system 200 has many applications. For example, when the system 200 is connectible to a stationary object, the system 200 can detect when an object moves or is positioned within the predetermined region of interest. This may be useful for various security applications. In other examples, the system 200 is connectible to a moving object, such as a vehicle, and the system 200 can determine when an object may pose a risk of collision when such an object moves within the predetermined region of interest. In other examples, the system 200 is connectible to a component that is moveable relative to another object that may be stationary, movable or moving.

An example of the latter described examples is a boom assembly. Boom assemblies may comprise a support arm for supporting equipment such as nozzle systems for agricultural purposes, excavation equipment, scaling tools, etc. A specific example that employs a boom assembly are vacuum excavation trucks. Vacuum excavation trucks use pressurized streams of fluids to dig a hole, a pit, a trench or a trough by loosening debris material such as soil, rocks and other materials. The loosened debris-materials are then pneumatically collected and removed by a vacuum system. Vacuum excavation can expose buried facilities without the risk of damage that may arise by digging with shovels or other heavy equipment.

Typically, the trucks can carry liquid-pressurization or pneumatic equipment, vacuum equipment and large tanks for containing the excavated soil, rocks and other materials. Booms are typically connected to the top of the tanks to connect a vacuum hose to the tank. The boom allows the user to move an input end of the vacuum hose about the truck during excavation operations.

In some instances, the trucks are able to access space-restricted areas where excavation is desired but the areas are either partially enclosed, enclosed or in proximity to other objects that may interfere with movement of the boom. For example, a space-restricted area may be near overhead lines and contact between the boom and the overhead lines could cause damage to both the boom and the lines.

Thus, in some embodiments, there is provided a boom assembly comprising a support arm and the object detection system of the present disclosure mounted on the support arm. Such embodiments facilitate the navigation of the boom assembly in, for example, a space-restricted area that may interfere with movement of the boom, or that may include objects that, if contacted, may damage the boom assembly.

Figure 5:
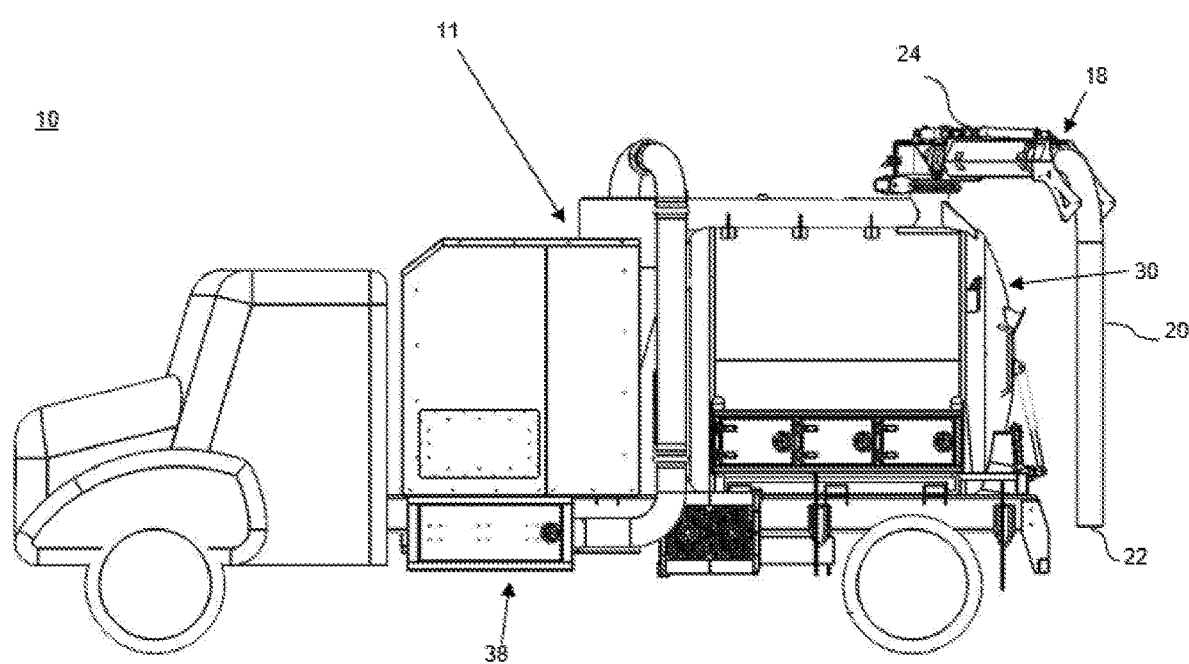
FIG. 5 is a side-elevation view of a vacuum-excavation apparatus that is fixed upon a vehicle with which embodiments of the present disclosure can be used.
Figure 7:
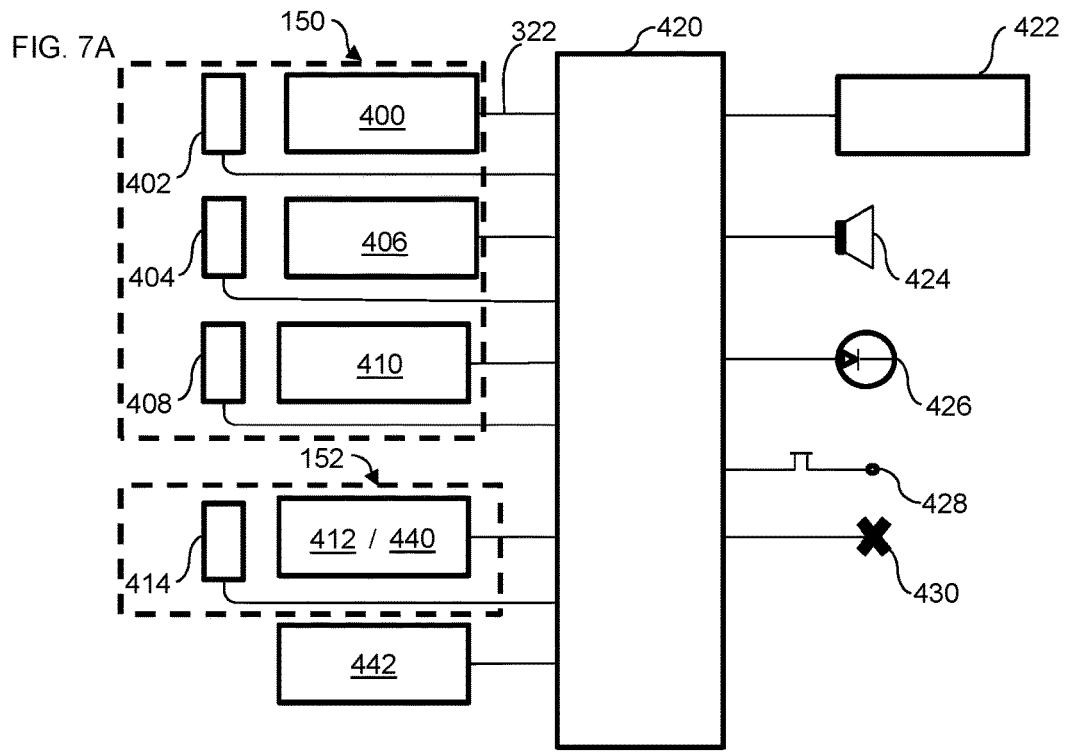
Figure 7:
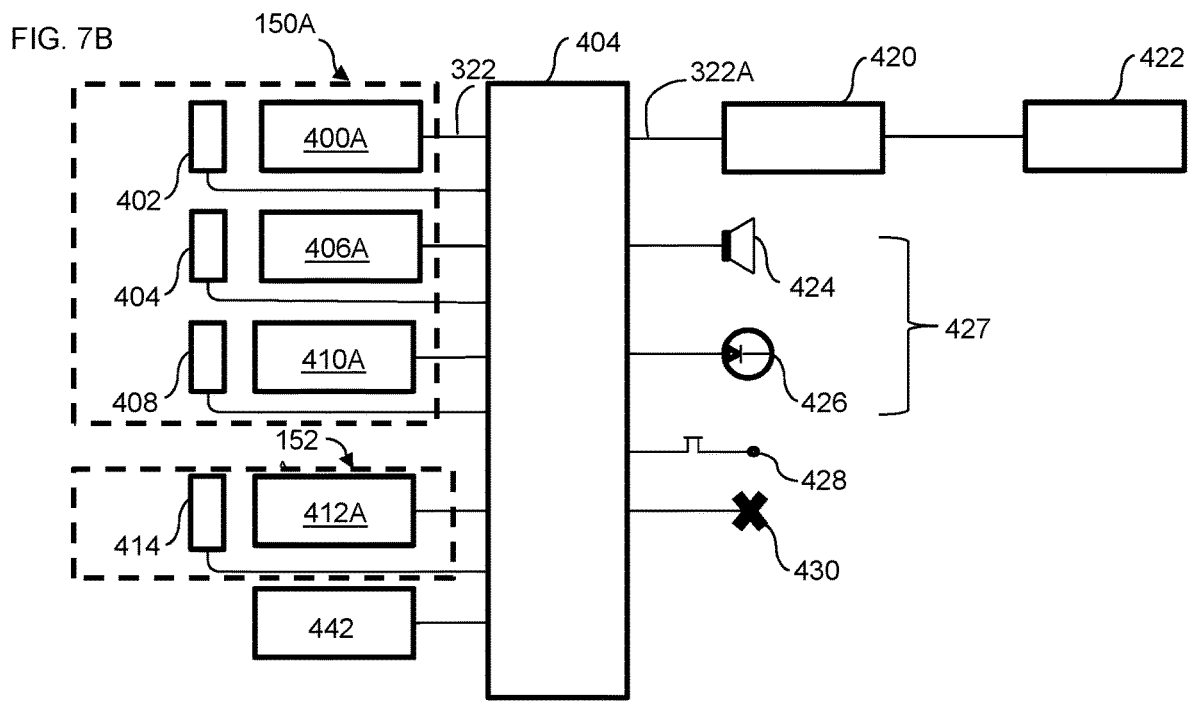

In a specific example, FIG. 5 shows a vehicle 10 that can support one embodiment of the present disclosure that relates to a vacuum-excavation apparatus 11. The vacuum-evacuation apparatus 11 comprises various components including a boom assembly 18, a tank 30 and a vacuum assembly 38. The vehicle 10 may be a truck with a chassis that has one or more rear-axles.

The boom assembly 18 comprises a vacuum tube 20 and a support arm 24. The vacuum tube 20 has an input end 22 that is in fluid communication with other sections of the vacuum-excavation apparatus 11. The support arm 24 is pivotally connectible to the tank 30. The support arm 24 supports the vacuum tube 20 so that the input end 22 can be positioned adjacent material to be excavated during excavation operations in the vicinity of the vehicle 10. As is understood by those skilled in the art, the input end 22 is fluidly connected to the vacuum assembly 38 so that during excavation operations materials such as rocks, soil, ice and other debris, collectively debris materials, are fluidized or entrained within a fluid, or fluid mixture, sucked into the input end 22 and conducted to other sections of the vacuum-excavation apparatus 11. In some embodiments of the present disclosure the boom assembly 18 weighs between about 550 pounds and about 650 pounds (one pound is equivalent to about 0.454 kilograms). In some embodiments of the present disclosure the support arm 24 of the boom assembly 18 may also pivot upwardly and away from the upper surface of the tank 38. In some embodiments of the present disclosure, the support arm 24 is extendible and retractable to increase the distance that the input end 22 can reach. In some embodiments of the present disclosure, the support arm 24 may have a retracted length of about 10 feet and an extended length of about 18 feet. In some embodiments of the present disclosure, the support arm 24 has a retracted length of about 12 feet and an extended length of about 16 feet.

In use, an operator can manipulate the vacuum tube 20 to position the input end 22 at various positions within an excavation site. The operator can also manipulate the position of the support arm 24 relative to the tank 38 by a human—machine interface, such as a remote control. For example, in order to advance the excavation operation, the operator may desire to pivot the support arm 24 about the tank 38, raise or lower the support arm 24, change the length of the support arm 24 or combinations thereof. Because the operator is focused on the excavation site and the excavation operation, oftentimes operators do not inspect whether or not the support arm 24 is clear to move in any of the three degrees of movement, which can result in a collision between part of the boom assembly 18 with an object that is proximal the excavation site. In some circumstances, a collision between a part of the boom assembly 18 and another object can cause property damage and/or a safety hazard if the object is a wire that is conducting electricity. Furthermore, depending on the ambient light, dust created during the excavation operation and the visibility generally at the excavation site, the operator may inspect for the freedom of movement of the support arm 24, but smaller objects such as wires may be missed.

FIG. 6A and FIG. 6B each shows an embodiment of the present disclosure for use with a support arm 124 of a vacuum-excavation apparatus 11. FIG. 6A shows the support arm 124 as comprising a first end 124A and a second end 124B. The first end 124A includes a first pivot point 126 that allows the support arm 124 to pivot about the tank 38 (not shown in FIG. 6). The second end 124B includes a transition arm from which the vacuum tube 20 can extend (also not shown in FIG. 6). Between the two ends 124A, 124B is a middle portion 124C of the support arm 124. A second pivot point 127 can be positioned between the first end 124A and the middle portion 124C and a first actuator 128 can also be connected between the first end 124A and the middle portion 124C. The actuator 128 can pull the middle portion 124C upwardly and/or push it downwardly relative to an upper surface of the tank 38 (not shown in FIG. 6). The middle portion 124C can also comprise an outer portion 130 and an inner portion 132 with the inner portion 132 nested within and extendible through the outer portion 130. The middle portion 124C may also include a second actuator 134 that is connected at one end to the outer portion 130 and to the inner portion 132 at the other end so that actuation of the second actuator 134 causes the inner portion 132 to move (for example telescopically) through a portion of the outer portion 134 to either extend or retract the support arm 124.

The first actuator 128 and the second actuator 134 can be powered by the same or different power systems and types of power systems. For example, the actuators 128, 134 can be powered by a pneumatic power system, a hydraulic power system, an electronic power system or combinations thereof An object detection system according to embodiments of the present disclosure are shown in FIG. 6A and FIG. 6B as comprising a first laser component 150 and a second laser component 152. However, the person skilled in the art will appreciate that FIG. 6 is an illustrative example and that other embodiments of the present disclosure may include both components 150, 152 or just one.

The first component 150 is configured to generate and transmit at least one augmented light signal. For example, the first component 150 may generate a first augmented light signal 154A.

that is fan-shaped and extends along a side surface of the support arm 124. The first component 150 may also generate a second augmented light signal 154B that extends along the opposite side surface of the support arm 124. The first component 150 may also generate a third augmented light signal 154C that extends along an upper surface of the support arm 124. The person skilled in the art will appreciate that not all three signals 154A, 154B or 154C are necessarily required but that when all three signals 154A, 154B and 154C are used, the first component 150 can create a virtual envelope of pulsed light that surrounds three sides of the support arm 124. In the event that the support arm 124 is moving and an object moves into the virtual envelope, that object will generate a reflected light signal that is received by the first component 150. If the object is within the predetermined region of interest within the virtual envelope a trigger output signal may be generated to indicate the presence of the object and that an event condition has occurred. In this fashion, the virtual envelope generated by the first component 150 can be used as an object detecting and/or collision alert system for when the support arm 124 is being pivoted about the first pivot point 126 and/or the second pivot point 127.

As shown in FIG. 6B, the first component 150 can be positioned on an upper surface of the support arm 124 upon the middle portion 124C. The first component 150 may be configured to transmit the first and second augmented light signals 154A, 154B at a first angle away from the side surfaces of the support arm 124 towards and past the second end 124B of the support arm 124. The first angle can be oriented not parallel to the respective side surfaces of the support arm 124 and the first angle can provide a sufficient energy density within the first and second augmented light signals 154A, 154B so that an object that is a small as a 12 American gauge wire (a diameter of about 2 mm) can generate a reflected light signal when it is within the predetermined region of interest. In some embodiments, the predetermined region of interest is designated to extend along the length of the support arm 124 and other components of the boom assembly 18.

In some embodiments of the present disclosure the object detecting system may also include the second component 152 that generates a fourth augmented light signal 156. The second component can be positioned proximal the second end 124B of the support arm 124 and the second component can be configured to generate and transmit the fourth augmented light signal 156 towards and past the second end 124B. The fourth augmented light signal 156 can be used as an object detecting and/or collision alert system for when the middle portion 124C of the support arm 124 is being extended.

FIG. 7A shows a schematic diagram of another embodiment of the object detecting system. In this embodiment, the first component 150 comprises three separate laser components 400, 406 and 410. Each of these laser components 400, 406 and 410 includes the components 204, 206, 208A, 208B described above in reference to FIG. 2A. Each of these laser components 400, 406 and 410 also have an associated lens assembly 402, 404 and 408 and each of which has the components 212 and 216 described above in reference to FIG. 2A. In the event that an object is detected within the predetermined region of interest in any of the augmented light signals generated by the first component 150, a trigger output signal 322 will be generated and forwarded to a programmable logic controller (PLC) 420 (or other similar computing device). The PLC 420 is in direct control of the power system that controls the movement of the boom assembly 18. In the event that the PLC 420 receives a trigger output signal 322, the PLC 420 can do one or more of the following: send a warning signal to a human-machine interface 422 so that the operator is made aware that an object has been detected within the predetermined region of interest; generate and send an activation signal to an audible alarm 424 so that an audible alarm signal is generated; generate and send an activation signal to a light-based alarm 426 (collectively the audible and visual alarms may be referred to as alarm 227) so that a visual alarm signal is generated; and, generate and send a power kill signal to a kill switch 230 of the power system so that no power is delivered for any further movement of the boom assembly 18. The PLC may also receive a manual override signal 228 so that an operator may override the power kill signal so that movement of the boom assembly 18 may resume.

FIG. 7A also shows the second component 152 that comprises a laser component 212 or another type of LIDAR laser component, for example a sweeping pulsed laser component that is known by those skilled in the art. The laser component 212 may include the same components as laser components 400, 406 and 410. The laser component 212 may also be associated with a lens assembly 214 that has the same components as the lens assemblies 402, 404, 410. Similar to the first component 150, the second component 152 can send a trigger output signal 322 to the PLC 420 when an object is detected within the predetermined region of interest.

FIG. 7B shows another embodiment of the present disclosure that has many of the same features as those shown in FIG. 7A. The primary difference between these two embodiments is that a first component 150A and a second component 152A (shown in FIG. 7B) do not include any computing device, rather there is one central computing device 404 that all components of the first component 150A and the second component 152A are in operative communication to send a trigger output signal 322 and the central computing device 404 can then process the received trigger output signal 322 and send an activation signal directly to the audible alarm 424, the light-based alarm 426 and the power kill switch 430. In some embodiments of the present disclosure, the central computing device 404 may also send a second trigger output signal 322A to the PLC which may send an activation signal to one or more of the audible alarm 424, the light-based alarm 428 and/or the power kill switch 430 and the HMI 422. The person skilled in the art will appreciate that the central computing device 404 will include many (if not all) of the same components of the computer 202 described above in reference to FIG. 2B and FIG. 2C. The person skilled in the art will also appreciate that the central computing device 404 may send one or more or all activation signals directly to the downstream components or one or more or all of the activation signals may be sent via the PLC 420 subsequent to the PLC 420 receiving the second trigger output signal 322A.

Figure 8:
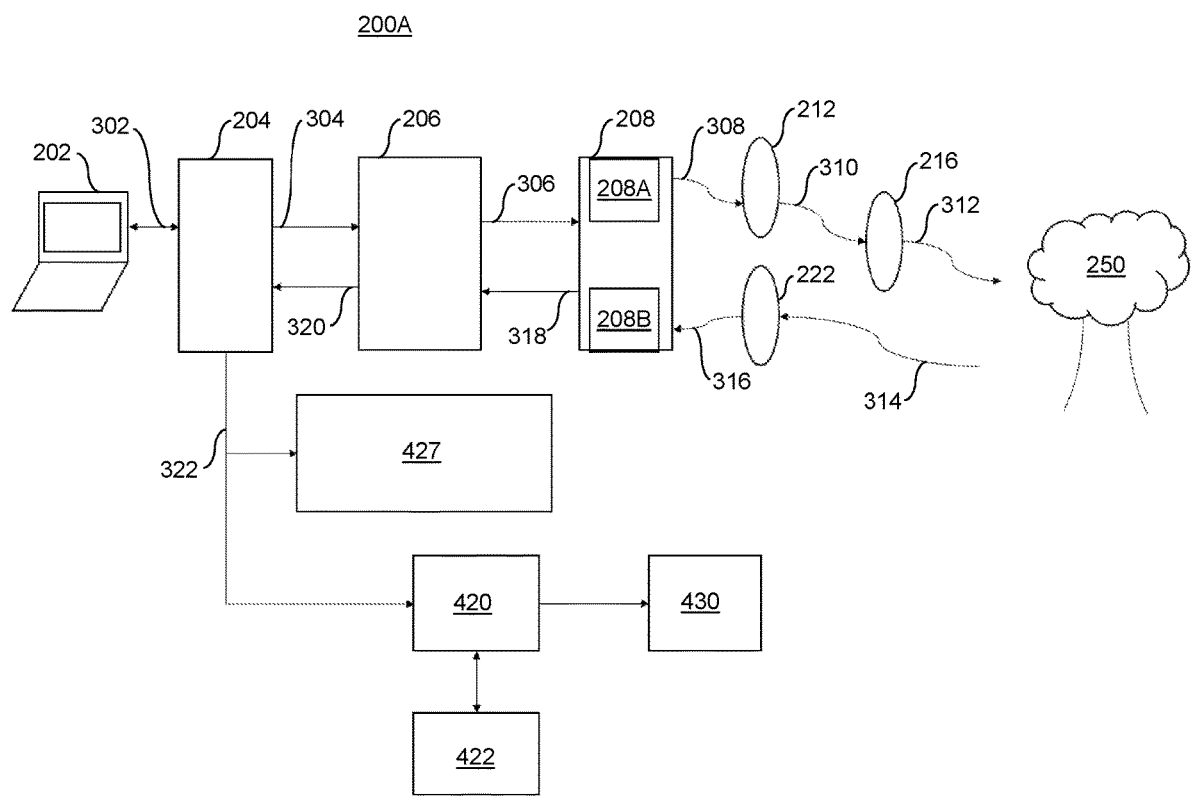
FIG. 8 shows a schematic of one embodiment of an object detecting system according to the present disclosure.

FIG. 8 shows another embodiment of an object detecting system 200A that has many of the same features and components described above in reference to FIG. 2A. The primary difference between FIG. 2A and FIG. 8 is that FIG. 8 shows the downstream components that are affected by the trigger output signal 322, which are described above in relation to FIG. 7A and FIG. 7B.

In some embodiments of the present disclosure, the object detecting system may also be used to return the boom assembly 18 to a transport position. For example, the PLC 420 and/or another computing device may respond to a "home signal" that is entered by an operator into the HMI 422. Upon receiving the "home signal" the PLC 420 will control the power system to automatically move the boom assembly 18 to a retracted and centralized position over the tank 38 that is suitable for driving the truck. In order to move the boom assembly 18 to the transport position, the object detecting systems of the present disclosure can be used to ensure that the automatic movement of the boom assembly 18 does not collide with any objects in the path of travel of the boom assembly 18 to the transport position.

I claim:

1. An object detection system comprising at least one laser component configured to:
   generate a laser pulse and transmit the laser pulse through a diverging lens assembly to generate a partially augmented light signal that is fan shaped in a major plane, which then passes through a converging lens assembly that compresses the partially augmented light signal in a minor plane to form a fan-shaped augmented light signal in a first plane;
   receive and detect a reflected light signal that is generated when the fan-shaped augmented light signal reflects off an object that is within a predetermined region of interest in the fan-shaped augmented light signal, wherein the reflected light signal moves through the diverging lens assembly in a direction causing the reflected light signal to converge into a focused signal;
   amplify and condition the focused signal to a conditioned signal when the focused signal passes through a reflected signal receiver; and
   decode the conditioned signal to generate a decoded signal when the conditioned signal passes through a decoder, wherein the decoded signal is for processing by a computer.

2. The object detection system of claim 1, wherein the object detection system is connectible to a primary object.

3. The object detection system of claim 2, wherein the primary object is moveable.

4. The object detection system of claim 1, wherein the at least one laser component comprises a first laser component and a second laser component, each of which are configured to generate the fan-shaped augmented light signal and to receive and detect a reflected light signal when an object is within a predetermined region of interest within each fan-shaped augmented light signal.

5. The object detection system of claim 4, wherein each laser component is configured to use a time of flight analysis to determine if an object is within the predetermined region of interest of each of one or more of the fan-shaped augmented light signals.

6. The object detection system of claim 5, wherein the laser component is further configured to generate a trigger output signal that can be transmitted to a computing device for sending an activation signal to one or more of: an audible alarm, a light-based alarm and a power kill switch.

7. The object detection system of claim 6, wherein the trigger output signal is a current loop that is from about 4 mA to about 20 mA.

8. The object detection system of claim 4, wherein the fan-shaped augmented light signal generated by the first laser component and the fan-shaped augmented light signal generated by the second laser component have different orientations relative to each other.

9. The object detection system of claim 1, wherein the fan-shaped augmented light signal has an angle of divergence of about 10 degrees to about 70 degrees.

10. The object detection system of claim 1, wherein the predetermined region of interest is from 0.5 m to 2.0 m away from the at least one laser component.

11. The object detection system of claim 1, wherein the laser pulse has a wavelength of about 700 nm to about 1200 nm.

12. The object detection system of claim 1, wherein the fan-shaped augmented light signal is a continuous augmented light signal.

13. A boom assembly comprising a support arm and an object detection system mounted on the support arm, the object detection system comprising at least one laser component configured to:
   generate a laser pulse and transmit the laser pulse through a diverging lens assembly to generate a partially augmented light signal that is fan shaped in a major plane, which then passes through a converging lens assembly that compresses the partially augmented light signal in a minor plane to form a fan-shaped augmented light signal in a first plane;
   receive and detect a reflected light signal that is generated when the fan-shaped augmented light signal reflects off an object that is within a predetermined region of interest in the fan-shaped augmented light signal, wherein the reflected light signal moves through the diverging lens assembly in a direction causing the reflected light signal to converge into a focused signal;
   amplify and condition the focused signal to a conditioned signal when the focused signal passes through a reflected signal receiver; and
   decode the conditioned signal to generate a decoded signal when the conditioned signal passes through a decoder, wherein the decoded signal is for processing by a computer.

14. The boom assembly of claim 13, wherein the at least one laser component of the object detection system comprises a first laser component positioned on an upper surface of a middle portion of the support arm and a second laser component positioned proximal an end of the support arm.

15. The boom assembly of claim 14, wherein the first laser component is configured to generate the fan-shaped augmented light signal and the second laser component configured to generate a different type of light signal.

16. The boom assembly of claim 13, which is mounted on a tank of a vacuum excavation truck, and which further comprises a vacuum tube supported by the support arm.

* * * * *